Dec. 29, 1959  J. FORMAN  2,919,436
MULTIPLEX MEASURING DEVICE
Filed March 15, 1956  4 Sheets-Sheet 1
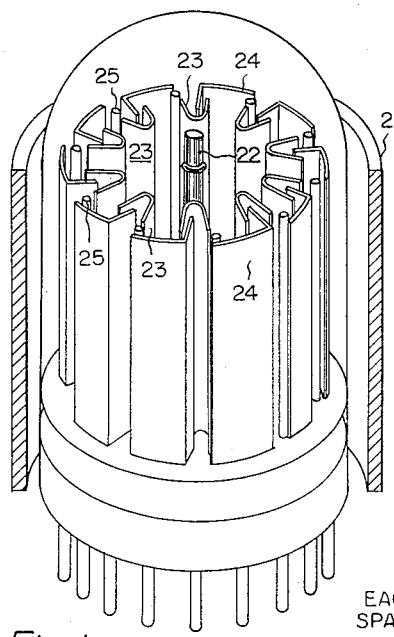
Fig.1
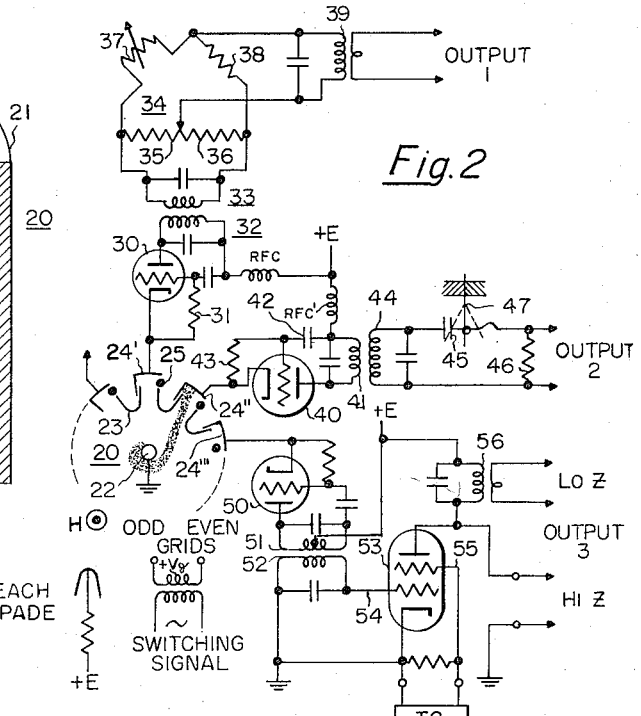
Fig.2
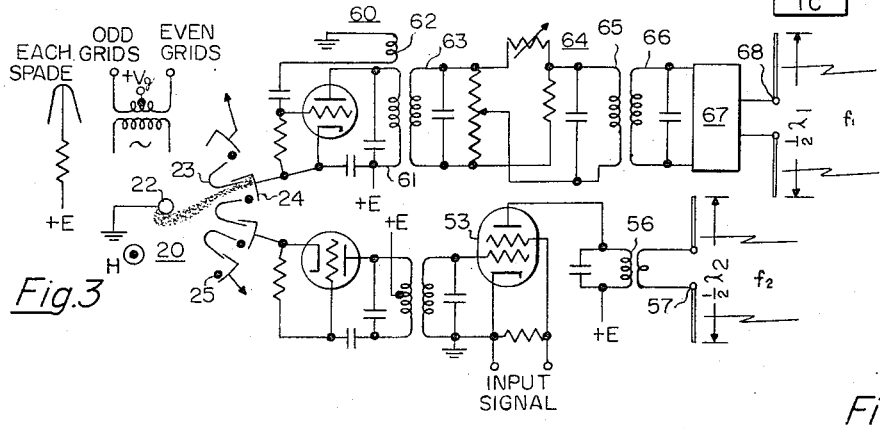
Fig.3
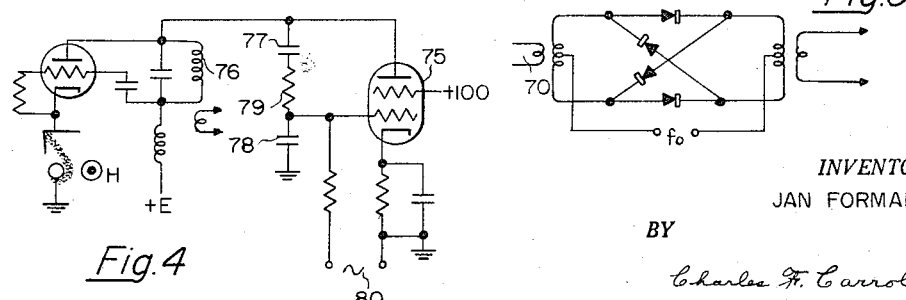
Fig.4
Fig.5
INVENTOR.
JAN FORMAN
BY
Charles F. Carroll, Jr.
ATTORNEY Dec. 29, 1959 J. FORMAN 2,919,436
MULTIPLEX MEASURING DEVICE
Filed March 15, 1956 4 Sheets-Sheet 4

INVENTOR.
JAN FORMAN
BY
Charles F. Carroll, Jr.
ATTORNEY

United States Patent Office 2,919,436
Patented Dec. 29, 1959

2,919,436
MULTIPLEX MEASURING DEVICE

Jan Forman, Malvern, Pa., assignor to Burroughs Corporation, Detroit, Mich., a corporation of Michigan Application March 15, 1956, Serial No. 571,710

9 Claims. (Cl. 340—183)

This invention relates to multiplex measuring devices and particularly concerns a system of sequentially gated alternating current carrier circuits in a number of signal channels.

In known circuits for measuring variations in circuit parameters, or electrical potentials or currents as indicia of variations in various physical quantities, the limiting or smallest quantity which can be measured with reliability is determined by the noise level of the measuring channel. This is a primary limitation upon the ultimate precision of which any given system is capable. Accordingly, a reduction in the noise level of a measuring circuit improves its capability for measuring small signals.

Magnetron beam switching tubes, are very useful in multi-channel measuring and telemetering systems, providing a very flexible multiplexing circuit which can function at high speeds and with reliability. Such multiplex circuit use of a magnetron beam switching tube is described and claimed in a copending application for United States Patent by Saul Kuchinsky and Hilary Moss, entitled "Multiplexing System," Serial No. 438,805, filed June 23, 1954 now Patent, No. 2,848,647. However, the noise level on the output electrodes of a magnetron beam switching tube is high, and this imposes serious limitations on its use in low-level signal channels. One possible explanation of this noise is that the large number of electrodes within the tube experience some degree of randomly varying current distribution, and that even within one beam holding position there is some random fluctuation in the current division between spades, target and switching grid. This type fluctuation is known to be a serious source of broad band noise in electronic circuits.

An object of this invention is to provide a low noise multiplex measuring device.

Another object of this invention is to provide a multiple channel, time sharing, measuring device utilizing a magnetron beam switching tube to gate on measuring circuits in sequence without adding significant noise energy to the gated circuit.

Another object of this invention is to provide a multiple channel, time sharing, telemetering system wherein a magnetron beam switching tube gates on successive channels useful for low-level signal operations.

Yet another object of this invention is to provide a multiplex measuring and telemetering device incorporating a magnetron beam switching tube for gating on each measuring circuit and its associated telemetering channel in rapid and reliable succession and operating at a high signal-to-noise ratio at every gated position.

In accordance with this invention there is provided a system of alternating current carrier channels, including generators of distinct frequency alternating currents, with a modulator connected to each channel and a magnetron beam switching tube's output electrodes connected to energize the generators in sequence.

For a detailed description of this invention, reference is made to the specification and drawings in which:

Fig. 1 is a view of a magnetron beam switching tube;

Fig. 2 is a schematic view of a multiplex measuring device;

Fig. 3 is a schematic view of a multiplex telemetering device;

Fig. 4 is a schematic view of a frequency modulated signal channel;

Fig. 5 is a schematic view of a ring modulator to impress a signal on a carrier voltage;

Fig. 16 is a schematic diagram of a variable frequency oscillator shiftable to a selected frequency by a magnetron beam switching tube.

Figure 6:
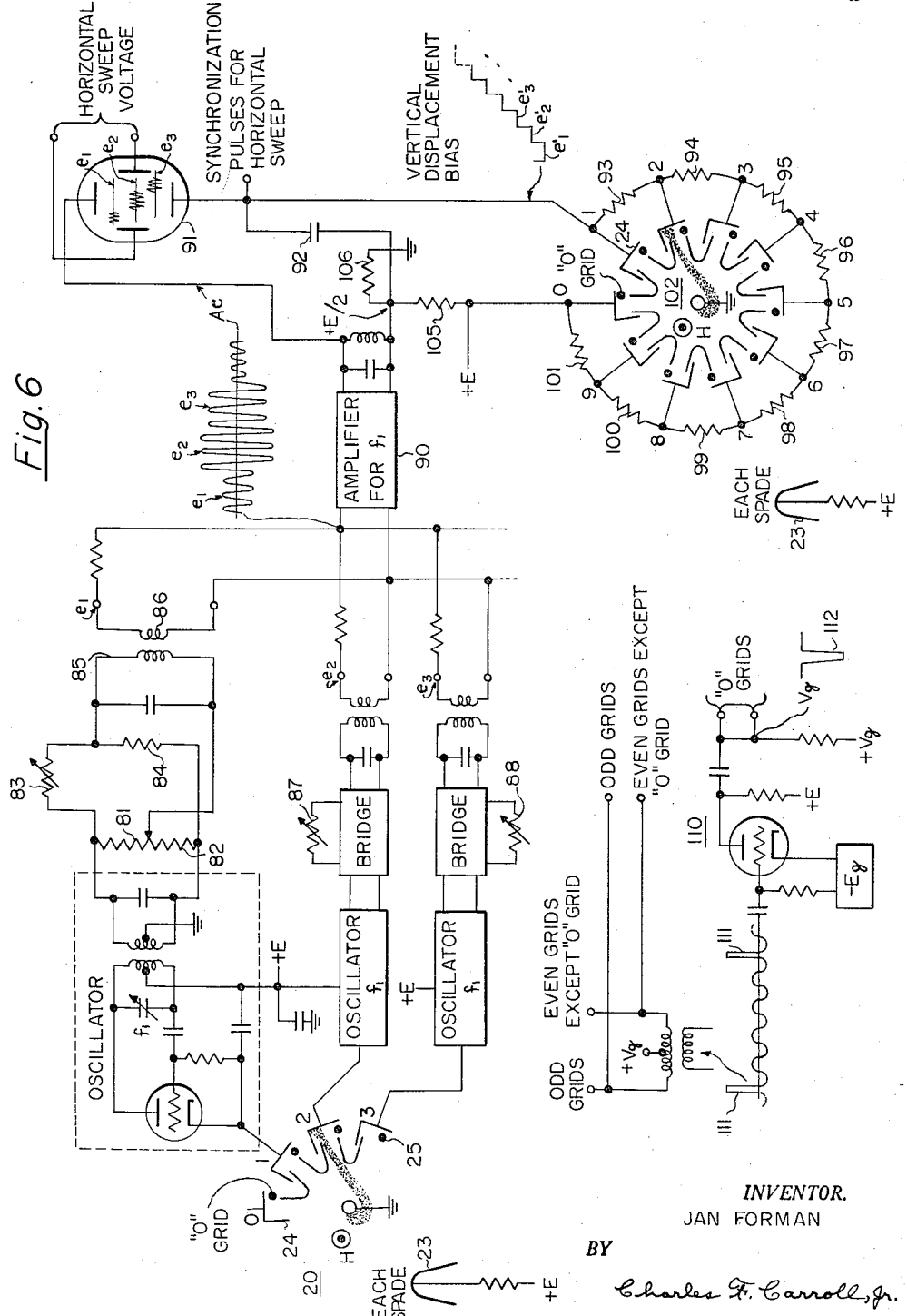
Fig. 6 is a schematic view of an overall system using a common frequency carrier for all measured voltages.

As shown in Fig. 1, the magnetron beam switching tube generally indicated at 20 is a multi-position beam tube of the type shown and described in United States Patent to Sin-pih Fan et al., No. 2,721,955. By use of the crossed electric and magnetic fields of a magnetron type structure and of a number of electrodes in successive arrays around a cathode, this tube is capable of providing a high current electron beam to selected ones of a plurality of output electrodes rapidly and with great reliability.

As shown in Fig. 1, a cylindrical magnet 21 encloses tube 20 and provides an axial magnetic field therethrough. Tube 20 contains a central axial cathode 22 surrounded by several concentric arrays of electrodes. On a circular locus nearest to the cathode are the beam forming and holding electrodes 23, called spade electrodes. Beyond the spade electrodes on another circular locus are the target electrodes 24, positioned peripherally on this circle so as to cover the inter-spade spaces and to collect beam current flowing into such spaces between spades. Intermediate between one edge of each spade and the near edge of each target proximate to that spade are the switching grid electrodes 25. These grids also are on a circular locus centered on the cathode 22.

With the cathode heated to electron emission temperature and a positive potential on the spade electrodes and target electrodes, the magnetic field from magnet 21 is above that value required for magnetron type cut-off of current in tube 20 and no current will flow. However, if one of the spade electrodes is reduced in potential to about half its previous potential the voltage gradients within the tube are distorted and a beam will form. This electron beam grazes the low potential spade and strikes the adjacent target electrode. A small portion of the electron beam does flow to this spade. With a suitable series resistor interposed in the connection of each spade to its positive voltage supply, this small portion of the beam current produces an IR drop which enables the spade to hold the beam stably in place once it grazes that spade.

Switching grid electrodes 25 upset this stable beam holding condition when a suitable negative potential is applied to the grid which is in the same inter-spade space as is the beam. As this grid goes negative, the beam fans out across the target electrode toward this switching grid and some of it strikes the next spade electrode. This fraction of beam current produces another IR voltage drop which lowers the potential of this next spade. With a lowered potential on the next spade, the beam switches over to the next target. This switching action occurs at a very rapid rate, the time required to switch from one target to the next being in the order of one tenth of a microsecond. However, with each beam position surrounded by several electrodes, random current division between electrodes, and other phenomena, cause the output current from each target to have a high noise level.

As shown in Figs. 2 and 3, the speed and reliability of beam switching tube 20 is used to gate on a succession of signal channels but in such a manner as to avoid the high noise levels present on each target's output current. A separate oscillator is connected to each target to receive electrons therefrom and to be gated on. The primary electron stream of the beam switching tube does not enter the signal channel but flows through the oscillator and back to a voltage supply. Further, an alternating voltage at oscillator frequency is provided for use in an output circuit only through a tuned coupling device which limits the transmitted energy to a comparatively narrow frequency pass band. Also, each oscillator tends to provide its alternating voltage at a constant amplitude determined by circuit parameters and supply voltage of the oscillators. The signal is applied as modulation of the coupled output device. While several forms of oscillators and modulators are shown, it will be obvious that it is within the scope of this invention to utilize other suitable oscillators and modulators which fulfill the above described conditions.

As shown in Fig. 2, tube 20 is connected to a plurality of oscillators to generate alternating current at various desired frequencies. Target 24′ of tube 20 is connected to the cathode of oscillator tube 30 and to the low side of its grid resistor 31. A resonant circuit 32 is coupled between plate and control grid of tube 30 with the radio frequency choke RFC connected thereto for conducting electrons from tube 30 to a supply voltage +E. Tube 30 could be a tetrode or pentode or a transistor oscillator within the scope of this invention. This oscillator circuit builds up constant-amplitude alternating voltage across circuit 32. Resonant circuit 33 is coupled to resonant circuit 32 and applies voltage across resistors 35 and 36 of voltage dividing network 34. A bridge circuit is shown, utilizing the variations of resistor 37, in a bridge circuit with resistors 35, 36 and 38, to produce an output voltage at the frequency of resonant circuit 32. This voltage is representative of the variations in ohmic value of resistor 37 which is varied by other physical parameters. For example, a strain gauge could vary resistor 37 in accordance with strain movement (elongation and contraction) of a body to which that type resistor is attached, a thermally sensitive resistor 37 could vary in ohmic value with temperature, and a photosensitive resistor could vary in ohmic value with the value of incident radiation. Resonant circuit 39 is connected to the bridge 34 to receive the output voltage and to filter out other frequencies and noises. This voltage then appears on an output coupling circuit as output "1." The comparatively narrow frequency pass band of circuits 32, 33 and 39 keeps the noise level of this output at a low value.

Another generator of alternating current is connected to target 24″, of tube 20. While a triode tube 40 is shown in the oscillator, the latter may have a different type tube or a transistor capable of receiving electrons from target 24″ and generating oscillations at a desired frequency. Resonant circuit 41 is connected between plate and control grid of tube 40 in a known oscillator circuit. Positive voltage is applied from a voltage +E through its choke coil RFC′. With coupling capacitor 42 and resistor 43 connected to the control grid, a constant voltage +E applied to the plate of tube 40, and with the beam of tube 20 on target 24″; the oscillations of the voltage across resonant circuit 41 will build up until the positive-voltage swings of the control grid of tube 40 draw enough current to develop an IR drop voltage across resistor 43 which biases tube 40 so high as to check any further increase in amplitude. Since voltage +E and resistor 43 do not vary, these oscillations will remain stably at constant amplitude whenever the beam of tube 20 strikes the target 24″. The oscillations of tube 30 are also of constant amplitude for the same reason. This inherent tendency to constant amplitude contributes materially to the low noise characteristics of the coupled signal channel.

Resonant circuit 44 is coupled to circuit 41 and has a constant-amplitude voltage across it at its resonant frequency. These resonant circuits restrict the applied voltage to a frequency pass band of limited width, which further reduces the noise in the signal channel. Capacitor 45 and resistor 46 are connected across circuit 44. Capacitor 45 is a variable capacitor, the spacing between its plates varying as a function of motion of a mounting rod 47. When the reactance of capacitor 45 is larger than resistance of resistor 46 in scalar value, this motion causes the voltage across resistor 46 to vary as a function of the motion of rod 47, producing output "2" as a measurement of motion of rod 47.

Tube 50 is connected into yet another oscillator circuit and to target 24‴ for actuation upon receipt of the beam of tube 20. Resonant circuit 51 again determines a desired frequency of oscillation. While a typical coil-capacitor combination has been shown, other resonators such as cavity resonators, fore-shortened and full quarter-wave or half-wave line sections, magnetostriction and piezoelectric resonators can be used.

Resonant circuit 52 is coupled to the oscillator and applies the resonant frequency voltage to grid 54 of tube 53. Tube 53 is a multiple grid, variable gain tube such as the 6L7 and its successors. With an alternating voltage applied to grid 54 and a resonant circuit 56 connecting the plate to a voltage supply +E, output voltage will vary with variations in the voltage applied to grid 55. Accordingly, a signal input from thermocouple TC or any other suitably matched signal source is applied to grid 55, and output "3" will vary in amplitude in accordance with this signal on grid 55. Instead of being connected as an amplitude modulator, tube 53 could be connected to the oscillator as a reactance tube, and the incoming signal used to frequency or phase modulate the oscillator.

Other well known oscillator circuits may be connected to the remaining targets of tube 20 as desired or required in an overall multiplex measuring system, and modulated by the described and other methods by signals which are to be measured. Every channel utilizes the low-noise gating action produced through the use of oscillators which separate beam current from the signal channel and provide a constant amplitude output, combined with band pass coupling circuits which restrict the noise spectrum.

Fig. 3 shows similar measuring circuits connected to a magnetron beam switching tube 20, with the output alternating voltage being amplified to a more powerful level and then radiated for utilization at some remote point. This provides a multiplex, radio telemetering use for the circuit, since the modulated alternating voltage provides the following advantages: reduction of noise in signal channels using magnetron beam switching tubes, and wireless transmission to the remainder of a measuring or guidance system.

Oscillator 60 uses resonant circuit 61 to provide a tuned-plate circuit and a tickler coil 62 coupling the grid thereto in phase for oscillations. Resonant circuit 63 couples the oscillator to voltage dividing bridge network 64. The output of bridge 64 is coupled through resonant circuits 65 and 66 to amplifier 67 and thence to antenna 68. If the power level at circuit 65 is adequate, antenna 68 may be coupled thereto. Also, antenna 68 which is shown as a half-wave dipole can be any suitable radiator such as a long wire, helix, Yagi, horn, etc.

In a circuit similar to that connected to target 24''' of Fig. 2, tube 53 and resonant circuit 56 are coupled to another antenna 57 for transmission of output "3" to a remote position.

It is to be noted in Figs. 2 and 3 that the magnetron beam switching tube is not used as a preamplifier, but is used to gate a fixed frequency oscillator on. The primary electron stream from the magnetron beam switching tube is not entered in the signal channel, thereby avoiding much of the noise in this stream. This oscillator supplies the carrier energy to a modulator circuit, where a modulation representative of a parameter to be measured is imposed on the carrier. When a null-balancing bridge is used as the modulator, there is no output when there is no input, so the maximum sensitivity of the measuring system can be used. A ring or bridge modulator, using diodes for mixing carrier and modulation, also provides a system useful for small signals.

Fig. 4 shows a reactance tube 75 connected to one of the oscillators of Figs. 2 and 3 and responsive to signals applied to its control grid to vary the oscillator's frequency. Voltage from resonant circuit 76 is applied to a phase shifting network comprising capacitors 77 and 78 and resistor 79. This network shifts the voltage applied to the grid to about ninety degrees (90°) out of phase of the applied voltage. When grid voltage leads applied voltage, tube 75 plate current presents a capacitative reactance to resonant circuit 76. When grid voltage leads applied voltage, tube 75 plate current presents an inductive reactance to resonant circuit 76. In Fig. 4, resistor 79 is large in ohmic value compared to the reactance of capacitor 78 so current is about in phase with applied voltage and the voltage across capacitor 78 lags this current by 90 degrees. An inductive reactance is thus presented. Variation of grid bias by applying a voltage at input 80 will vary the magnitude of the reactance thus presented, causing a frequency modulation of the oscillator in accordance with the applied voltage.

Fig. 5 shows a modulator bridge used to provide a carrier frequency output proportional to the signal applied to signal input 70.

There is thus provided a multiplex measuring and telemetering device which isolates the noise and transients of the switching circuit from each signal channel, yet provides a constant-amplitude signal useful in a comparatively narrow frequency pass band of each signal channel.

Fig. 6 shows a succession of measuring circuits in a system utilizing a single frequency, $f_1$, for all oscillators. Each bridge is as shown in Fig. 2 for bridge 34. Resistors 81 and 82 are portions of one variable resistor and are adjustable to the same ratio as resistive measuring element 83 and resistor 84. At balance, there is practically no voltage, i.e. a null, between the variable contact on resistors 81 and 82 and the junction of resistors 83 and 84. As the physical phenomena to which resistance 83 is responsive varies, then the ohmic value of resistance 83 varies and the bridge's balance is upset. This causes a voltage $e_1$ at frequency $f_1$ to appear across resonant circuit 85 and on output circuit 86, whenever position 1 receives the beam in tube 20. The magnitude of voltage $e_1$ varies with resistance 83's departure from the value it had when the bridge was balanced.

In similar manner, the beam on target 24 for position 2 causes the next oscillator to apply a voltage at $f_1$ to the next bridge and produce an output voltage $e_2$ corresponding to variations of resistance 87 from the value it had when the associated bridge was balanced. When the beam advances to position 3, output voltage $e_3$ is produced corresponding to variations in resistance 88 from the value it had when the associated bridge was balanced. The target for each of the beam positions of tube 20 can be connected as shown for positions 1, 2 and 3. The output voltages $e_1$, $e_2$, $e_3$, etc., are applied to amplifier 90 and then in amplified form to the vertical deflection plates of a cathode ray tube 91. The display on the face of tube 91 would be a meaningless scramble except for a vertical display bias and horizontal sweep which are synchronized with the multiplexing steps from one channel to the next. Capacitor 92 couples the various amplitudes of voltage $f_1$ to a vertical plate of tube 91, yet presents a high reactance to the multiplexing frequency and allows a vertical displacement bias waveform to be built up across the capacitor 92 and thus be applied to the vertical deflection plates of tube 91.

Magnetron beam switching tube 102 is of the same type as tube 20, and both have the switching grid for the "0" position brought out separately. Beginning with the "1" position, resistors 93 to 101 are connected between targets 24 to produce a ring circuit, broken only in the sector between "0" position and "1" position. The anode supply voltage +E is connected to this resistor ring at the junction of resistor 101 and target 24 for "0" position. The junction of resistor 93 and target 24 for "1" position, at the other end of the resistor ring, connects to one of the vertical deflection plates of cathode ray tube 91. A voltage dividing circuit connects resistor 105 from voltage supply +E to the conductive path to the other vertical deflection plate of tube 91. The divider continues with resistor 106 to ground. With these connections, a potential of about half the supply voltage +E is applied to this other vertical deflection plate.

The potential of the vertical deflection plate connected to target 24 for "1" position will vary from near ground potential when the beam is in "1" position through successive increments at each beam position until it reaches supply voltage +E when on "0" position. These successive increments are developed by beam current flowing through the resistors 93 to 101 and thus developing IR drops which are progressively smaller as the beam advances around tube 102. When the beam is on "1" position, beam current, which is substantially constant magnitude due to the pentode character of tube 102, must flow through all resistors 93 to 101 and produces a maximum IR drop. This IR drop is of opposite polarity to voltage supply +E, and lowers the "1" position target nearly to ground potential. When the beam is switched to "2" position, there is one less resistor for the substantially constant beam current to flow through and a corresponding change in the IR drop so the potential applied to the vertical deflection plates jumps by one predetermined increment. The net potential, which is the voltage +E minus the IR drop from "2" position, is applied through resistor 93 to the vertical deflection plate connected to "1" position. When the beam is switched to "3" position, there is another jump in the net potential produced by the constant beam current flowing through one less resistor than for "2" position and developing a smaller IR drop. Resistors 94 and 93 connect this net potential to the vertical deflection plate as before described.

As the beam advances on to successive positions around tube 102, the IR voltage drop decreases another amount as each resistor of the ring is omitted from the beam current path to voltage +E. The net voltage of +E minus the IR drop jumps the same amount for each change in beam position. This net voltage is connected through the resistor ring back to "1" position and to the vertical plate connected to it, and has a waveform resembling a stairway. The actual change between beam positions can be adjusted by changing the resistance of resistors 93 to 101 to produce the desired change in IR voltage drop between positions. Since capacitor 92 receives each voltage increment as it is generated, the delay effects of the RC time constant of capacitor 92 and resistors 93 to 101 is minimized. For example, when the beam is switched from "9" to "0" position the IR drop of beam current through resistor 101 ceases and voltage $+E$ is the only voltage on the resistor ring. There is no IR voltage to reduce the net voltage from $+E$ because beam current from "0" position flows directly to the supply. This jump of the last voltage increment must charge capacitor 92 through the entire resistor ring, but capacitor 92 already is charged to the next lower bias level so the charging current is minimized. Also, capacitor 92 is small in micro-farad capacity since it is used to couple a higher frequency, $f_1$, to the vertical deflection plates and accordingly presents a high reactance to the beam switching frequency and to the vertical displacement bias waveform. Such a high reactance or low capacity allows the potential from remote beam positions, such as "0" position, to appear across capacitor 92 with very little delay.

With these vertical displacement biases synchronized with horizontal sweeps of the electron beam and with application of various measurement voltages $e_1$, $e_2$, $e_3$, etc., a multiple trace presentation is achieved on the fluorescent face of tube 91. Each cycle of samplings of each channel is initiated in exact synchronism through synchronizing pulses applied to amplifier 110 and then to the separate "O" grids of beam switching tubes 20 and 102. Every tenth cycle of the driving voltage has a larger amplitude half-cycle 111. Grid bias —$E_g$ on amplifier 110 is enough to prevent any output to the "O" grids except when pulses 111 are applied. These pulses override bias —$E_g$ and cause a large negative going pulse 112 to be applied to the "O" grids. This assures synchronous operation within a few cycles.

Figure 7:
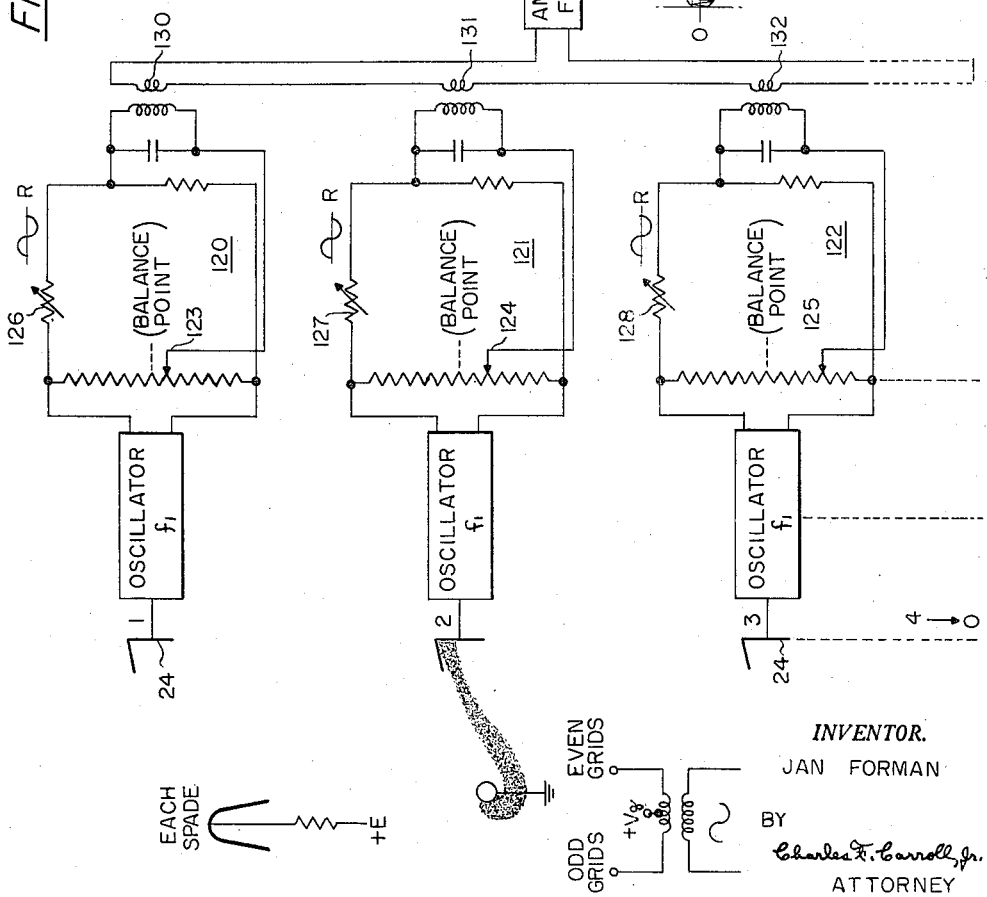
Fig. 7 is a schematic view of another common frequency system utilizing bridge unbalance for separation of signals.

Fig. 7 illustrates an embodiment wherein bridge unbalance of bridges 120, 121 and 122, by presetting movable contacts 123, 124 and 125 definite and progressively greater amounts off balance, provides a vertical displacement bias to separate presentation of their respective signals on a cathode ray tube. For convenience of explanation, each of the resistive measuring elements 126, 127 and 128 are shown to be responding to a measured parameter with the same sinusodial variation of resistance R. These variations are superimposed upon the present unbalance of each bridge and cause a variation about a mean amplitude of the alternating voltages on output circuits 130, 131, and 132. As shown, a measuring circuit can be provided for each target 24 of a magnetron beam switching tube, with all outputs feeding amplifier 129. Amplifier 129 is tuned to oscillator frequency $f_1$, providing high amplification of wanted signals and sharp rejection of other frequencies and noise. Resonant output coupling 133 applies these amplified signals to a detector comprising diode 134, radio frequency by-pass capacitor 135 and diode load resistor 136. The output waveform is the envelope of the radio-frequency voltages applied to the detector. In addition to the signal waveform, a direct-current component is included, representative of the voltage due to preset unbalance on the bridge. With the unbalance progressively greater as described, each signal's trace will be separated vertically from the others. Also this jump in level between signals can help synchronize the horizontal sweep. So long as the variations of resistive elements 126, 127 and 128 are not rapid, a very narrow frequency band will pass $f_1$ modulated by such slowly changing signals as the resistances generate. For example, with strain gauges, less than 10 c.p.s. suffices; in which case the switching frequency of the beam tube determines the required pass band about $f_1$. If a rapidly varying parameter is to be measured, wider bands are required on all tuned circuits after each bridge or other modulator.

As stated in connection with Fig. 2, other oscillator circuits may be utilized in the target circuits of tube 20. Figs. 8 to 13 show magnetron type tubes in oscillator circuits, wherein the electrical or magnetic field is varied by receipt of beam current from tube 20, to gate the magnetron type oscillator from a non-oscillatory condition to an oscillating condition.

Figure 8:
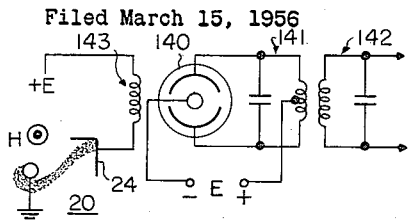
Fig. 8 is a schematic diagram of a magnetron oscillator having an electromagnet gated on by a beam tube.

Fig. 8 shows a split anode magnetron 140 connected to resonant circuit 141, with tuned output circuit 142 coupled to circuit 141. Winding 143 is an electromagnet positioned to place a magnetic field through magnetron 140 parallel to and symmetrical about the tube's axis. Winding 143 has sufficient turns to develop the magnetic field intensity required by tube 140 for the desired oscillations, when beam current flows through winding 143. With supply voltage E applied to tube 140, oscillations will be produced every time the beam advances around tube 20 to strike target 24 which is connected to winding 143. The output voltage of such oscillations appears across resonant circuit 142 and is used in various modulating devices shown in Figs. 2, 3, 4 and 5. Beam current flows only through winding 143, to establish conditions needed for oscillation of tube 140, and does not enter the signal channel.

Figure 9:
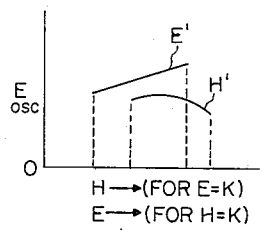
Fig. 9 is a graphical presentation of oscillation ranges for variations in magnetic and electric fields.

Fig. 9 shows two magnetron characteristics of importance to gating on a magnetron oscillator. For a given anode voltage, magnetrons have ranges, or modes, of varying magnetic field permeating them, wherein they are capable of producing oscillations. One of these characteristics is shown as curve H'. Also, for a given magnetic field, magnetrons have ranges of varying electrical field or anode potential wherein they are capable of producing oscillations. One of these characteristics is shown as curve E'. Above and below each oscillatory range for magnetic field or electrical field, the tube is in a non-oscillatory region. Accordingly, beam current can be applied in polarity to move the magnetic-to-electric field relationship into the oscillatory range from either direction as required.

Figure 10:
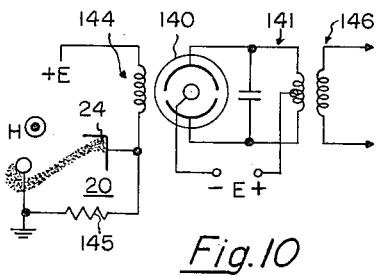
Fig. 10 is a schematic diagram of another magnetron oscillator having an electromagnet gated to operating level by a beam tube.

Fig. 10 shows a circuit similar to Fig. 8, except that winding 144 which produces the axial magnetic field needed by tube 140 has fewer turns and requires more current to produce the required field intensity than tube 20 can provide. Resistor 145 shunts target 24's circuit to cathode 22 and ground, and draws a steady current from $+E$ through winding 144 which produces only a major fraction of the required ampere-turns. When the beam in tube 20 reaches target 24 connected to winding 144, beam current is added to the current through winding 144 and raises the total ampere-turns to the level producing the magnetic field which tube 140 requires for oscillations. In this manner, beam switching tube 20 need supply only a differential energy to place tube 140 in oscillating condition. More powerful oscillators could be gated on with this differential type control, or winding 144 could have a smaller inductance and thus permit a more rapid rise to oscillating conditions when the beam strikes that target 24. This more rapid rise time would allow a faster switching between target positions and successive oscillators. Output 146 is shown as untuned, which all output circuits can be if band-pass and impedance requirements make an untuned coupling desirable.

Figure 11:
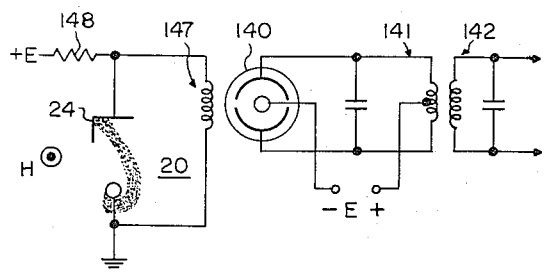
Fig. 11 is a schematic diagram of yet another magnetron oscillator having an electromagnet gated down to operating range by a beam tube.

Fig. 11 shows a magnetron oscillator as in Fig. 8, with winding 147 drawing so much current from supply $+E$ through resistor 148 as to place a magnetic field through tube 140 in excess of the field needed for oscillations. As shown in Fig. 9, and described therefor magnetrons have ranges, or modes, of oscillation which extend only over a limited range of variation of magnetic field-to-electric field relationship. Above and below each oscillatory range for variations of magnetic field H or of cathode-to-anode potential E, the tube is in a non-oscillatory range. Accordingly the current from +E through resistor 148, and then through winding 147 to ground, is set by the ohmic value of resistor 148 at a level which provides a magnetic field in excess of the value for oscillations in tube 140. When the electron beam of tube 20 strikes the target 24 connected to resistor 148 and winding 147, the beam current path shunts winding 147 to cause a current division between the paths, and also draws additional current from +E through resistor 148 to lower the voltage applied to both winding 147 and tube 20. These current changes lower the ampere-turns of winding 147, bringing the resultant magnetic field down to within the oscillating range of tube 140 with voltage E on its anodes.

Figure 12:
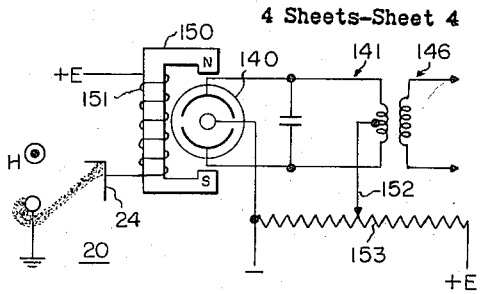
Fig. 12 is a schematic diagram of another magnetron oscillator having a permanent magnet and an electromagnet for gating total magnetic field into an operating range.

Fig. 12 shows magnetron tube 140 in a permanent magnet structure 150, on which a winding 151 is placed. With magnet 150 providing an intermediate strength magnetic field through tube 140, the anode voltage for tube 140 is adjustable through movement of contact 152 to place tube 140 either below or above the voltage-to-field relationship which enables oscillations to develop. This voltage adjustment in effect places the magnetic field either above or below the relationship necessary to oscillations.

With the magnetic field in excess of the range which enables oscillations, winding 151 is connected in a polarity to buck the permanent magnetism of magnet 150 and bring the field permeating tube 140 to within the range which enables oscillations when beam current strikes that target 24. This gates on that particular oscillator. With the magnetic field too low to enable oscillations, winding 151 is connected in an aiding polarity, to bring the magnetic field through tube 140 up into the range enabling oscillations when target 24 receives beam current.

Figure 13:
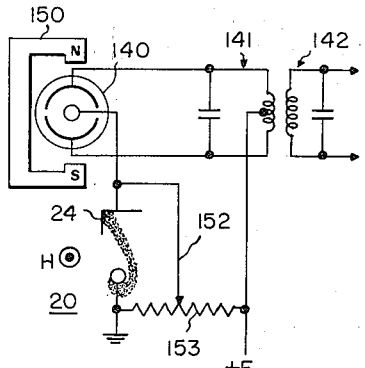
Fig. 13 is a schematic diagram of another magnetron oscillator with a beam tube to gate applied potential up to operating range.

Fig. 13 shows an alternate use of magnet 150 in a circuit where anode-to-cathode voltage is adjusted to be below the oscillatory range through adjustment of contact 152 along potentiometer 153. When the beam of tube 20 strikes target 24 connected to the cathode of tube 140, the portion of the potentiometer 153 between contact 152 and ground is nearly shunted out by the lower plate resistance of tube 20, thus bringing the voltage on tube 20 up into the oscillatory range.

Figure 14:
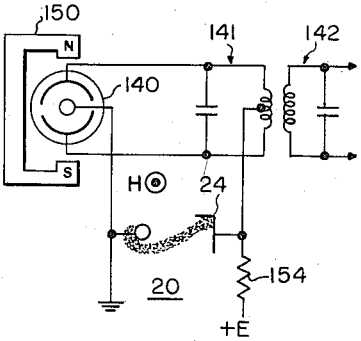
Fig. 14 is a schematic diagram of another magnetron oscillator with a beam tube to gate applied potential down to operating range.

Fig. 14 shows an oscillator circuit similar to Fig. 13, except that voltage supply +E puts an excessive voltage on tube 140, i.e. places it above the oscillatory range. When the beam in tube 20 strikes target 24, beam current flowing through resistor 154 drops the potential on tube 140 to place it within the oscillatory range.

In the oscillators shown in Figs. 8 to 14, it is to be noted that the beam current which gates on each oscillator does not enter any signal chamber, nor even appear in the output circuits 142 or 146.

Any one of the described and illustrated oscillators can be connected to each target of magnetron beam switching tube 20, to be gated into oscillation and the provision of a useful output upon receipt of the electron beam upon the connected target. Also, more than the ten positions of a single magnetron beam switching tube can be provided through cascade connection of a plurality of such tubes, such as shown and claimed in a copending application by Hilary Moss, Serial No. 487,548, entitled "Multiple Output Switching System."

Figure 15:
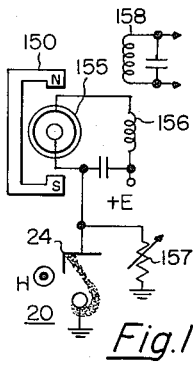
Fig. 15 is a schematic diagram of a magnetron oscillator in circuit with a magnetron beam switching tube to shift frequency.

Fig. 15 shows a gating circuit wherein beam current from tube 20 changes the cathode-to-anode voltage on magnetron tube 155. Magnetron tube 155 is already in oscillation, receiving current from +E in series with resistor 157, which produces an IR voltage which alters the applied cathode-to-anode voltage on tube 155 to appreciably less than +E. With magnet 150 providing an axial magnetic field, the above voltage on tube 150 causes it to oscillate at a frequency other than the resonant frequency of tuned circuit 158. When the beam of tube 20 strikes target 24, the beam path shunts resistor 157 and decreases the IR voltage drop between ground and tube 155, increasing the cathode-to-anode voltage on tube 155 and shifting its oscillating frequency to the resonant frequency of tuned circuit 158. Resistor 157 is adjusted to achieve this oscillating frequency while the beam is on the target 24 connected to resistor 157. This voltage is coupled from tube 155 through untuned coil 156 to tuned circuit 158 to provide a useful output. In this manner, magnetron tube 155 is switched from a frequency outside the pass band of a tuned output channel to a frequency within this pass band, by receipt of beam current in a circuit which does not enter the signal channel.

Fig. 16 shows another gating circuit wherein beam current from tube 20 changes the frequency of an oscillator to shift its frequency. Oscillator 160 is as shown and described above, except that its cathode is grounded rather than connected to a target 24 of beam tube 20. Reactance tube 75 is connected and functions as described for Fig. 4, except that a modified cathode resistor 161 is used and tube 20 has a cathode-to-target path shunting resistor 161. With the beam of tube 20 on the target 24 which connects to resistor 161, oscillator 160 and resistor 161 are adjusted to the frequency of tuned circuit 142, coupled to oscillator 160. When the beam of tube 20 advances to other targets 24, the cathode circuit of tube 75 jumps to the higher ohmic value of resistor 161 alone, which alters the voltage applied to tube 75 and shifts the frequency of oscillator 160. This shift takes the oscillator frequency out of the pass band for tuned circuit 142, effectively gating off that channel.

What is claimed is:

1. A multiple channel measuring device comprising a magnetron beam switching tube having a succession of beam receiving positions with each position including an output electrode from which a constant current is derived, a plurality of sources of alternating current which are normally in a non-conducting state each including a control terminal connected to one output electrode so that current flow from said output electrode causes said source to be conductive, a supply terminal for connection to a voltage source, and output coupling means; and a plurality of voltage dividing networks separately connected to each of said coupling means and including an output circuit and a parameter sensitive network element responsive to a measured parameter applied to said network element to produce a voltage on said output circuit characteristic of said parameter.

2. A multiple channel measuring device comprising a plurality of alternating current generators which are normally not generating current, a magnetron beam switching tube having a plurality of beam receiving positions with each position including an output electrode connected to one of said generators to supply a constant current thereto whereby each generator is triggered to a conducting state, and a plurality of voltage varying circuits coupled one to each of said generators and each including one current conductive element responsive to variations of a parameter to be measured to vary current conduction therethrough and to provide a variable output voltage.

3. A multiplex measuring system comprising a beam switching tube including a plurality of output anodes from which a constant current is derived, a plurality of alternating current generators which are normally non-conducting each connected to one of said output anodes and responsive to electrons therefrom to produce alternating current, and voltage dividing means coupled to said generator and including a variable circuit element and an output circuit responsive to variations in said circuit element to produce a correspondingly varying alternating output voltage.

4. A measuring system as in claim 3, wherein the voltage dividing means is a bridge balancing network.

5. In a system for measuring a plurality of low level signals a multiplexing system which comprises a multiple anode beam switching tube which provides constant current output from each anode, a plurality of alternating voltage generators which are normally non-conducting connected one to each anode and responsive to electrons from said anode to produce a discrete frequency alternating voltage, and a plurality of voltage dividing networks coupled one to each of said generators and responsive to variations in a selected physical parameter to produce a variable output voltage.

6. A multiplex measuring device comprising a first constant current magnetron beam switching tube having a plurality of output electrodes receiving an electron beam in succession, a plurality of normally non-conducting oscillators connected one to each of said output electrodes to receive electrons therefrom and generate a common selected frequency, a plurality of bridge type voltage dividing networks connected one to each oscillator and each producing an output voltage representative of unbalance of that bridge network, an amplifier commonly connected to said bridge networks to receive said output voltages and to produce an amplified form thereof, a cathode ray tube display device, and a second constant current magnetron beam switching tube having a plurality of output electrodes and synchronized with said first magnetron beam switching tube and having an output circuit coupled to said display device such that a different vertical bias voltage is applied to said display device from each output electrode whereby said signals are separated vertically in said display device.

7. In a multiplexing system a gating circuit comprising a variable frequency oscillator normally in a non-conducting state and responsive to an applied voltage to produce an oscillating voltage and to changes in said applied voltage to change the frequency of said oscillating voltage, circuit means connected to said oscillator to provide a selected applied voltage, a beam switching tube including a cathode to output electrode electron conductive path shunting said circuit means to cause said applied voltage to change when said output electrode receives an electron beam, thereby changing the frequency of said oscillating voltage to a selected frequency, and an output circuit coupled to said oscillator and tuned to resonance at said selected frequency.

8. In a multiplexing system a gating circuit comprising an oscillator normally in a non-conducting state and responsive to applied voltage to produce an oscillating voltage and including a reactance tube responsive to changes in voltage applied thereto, to change the frequency of said oscillating voltage, circuit means connected to said reactance tube to provide a selected voltage applied thereto, a beam switching tube including a cathode to output electrode electron conductive path connected to said circuit means to cause the voltage applied to said reactance tube to change when said output electrode receives an electron beam, to change the frequency of said oscillating voltage to a selected frequency, and an output channel coupled to said oscillator and having a band pass transmission characteristic at said selected frequency.

9. A multiple channel measuring device comprising a plurality of alternating current generators which are normally not generating current, a magnetron beam switching tube having a plurality of electron beam receiving positions with each position including an output electrode connected to one of said generators to supply a constant current thereto when an electron beam strikes said output electrode and thus triggers on said generator, a plurality of output circuits coupled one to each of said generators, and voltage varying means coupled to each of said output circuits for modulating the output of each of said generators.

References Cited in the file of this patent
UNITED STATES PATENTS

| | | |
|---|---|---|
| 1,797,746 | Young | Mar. 24, 1931 |
| 1,956,397 | Nicolson | Apr. 24, 1934 |
| 2,428,582 | Peterson | Oct. 7, 1947 |
| 2,480,130 | Grieg | Aug. 30, 1949 |
| 2,513,260 | Alfven | June 27, 1950 |
| 2,591,997 | Backmark | Apr. 8, 1952 |
| 2,645,680 | Reeves | July 14, 1953 |
| 2,662,175 | Staal | Dec. 7, 1953 |
| 2,680,210 | Miller | June 1, 1954 |
| 2,706,265 | Buehler | Apr. 12, 1955 |
| 2,748,278 | Smith | May 29, 1956 |

UNITED STATES PATENT OFFICE

CERTIFICATE OF CORRECTION

Patent No. 2,919,436                        December 29, 1959

Jan Forman

It is hereby certified that error appears in the printed specification of the above numbered patent requiring correction and that the said Letters Patent should read as corrected below.

Column 5, line 41, for "of", second occurrence, read -- with --; line 44, for "leads" read -- lags --; column 9, line 55, for "chamber" read -- channel --.

Signed and sealed this 19th day of July 1960.

(SEAL)
Attest:

KARL H. AXLINE
Attesting Officer

ROBERT C. WATSON
Commissioner of Patents